United States Patent [19]

Furtner

[11] 4,443,822
[45] Apr. 17, 1984

[54] REPRODUCING APPARATUS

[75] Inventor: Gerhard Furtner, Judenau, Austria

[73] Assignee: U.S. Philips Corporation, New York, N.Y.

[21] Appl. No.: 345,182

[22] Filed: Feb. 2, 1982

[30] Foreign Application Priority Data

Feb. 6, 1981 [AT] Austria .................................. 554/81

[51] Int. Cl.³ ........................ G11B 5/02; G11B 15/44; G11B 15/45
[52] U.S. Cl. ...................................... 360/67; 360/64; 360/65
[58] Field of Search .............................. 360/65, 67, 64

[56] References Cited

U.S. PATENT DOCUMENTS 3,265,818 8/1966 Goosen et al. ......................... 360/65
3,381,083 4/1968 Jensen et al. .......................... 360/65

Primary Examiner—Vincent P. Canney
Attorney, Agent, or Firm—Thomas A. Briody; Robert T. Mayer; Algy Tamoshunas

[57] ABSTRACT

A reproducing apparatus for information signals recorded on a record carrier in the form of a tape comprises two rotatable reproducing heads for alternately reproducing the information signals and a position encoder which supplies position pulses for determining the rotary position of the reproducing heads. A common pre-amplifier is connected to the reproducing heads, which amplifier is followed by compensation circuits associated with the two reproducing heads for signal correction, the output signal supplied by the compensation circuit associated with the reproducing head which instantaneously co-operates with the record carrier being applied to a signal processing circuit during the scanning period of the relevant reproducing head depending on the position pulses. Only one of the two compensation stages comprises an adjustable frequency-dependent network for frequency-response correction and at least one of the two compensation stages comprises a further adjustable frequency-independent network for amplitude correction. This enables the frequency response and the amplitude characteristics of the two reproducing heads to be material to each other.

4 Claims, 4 Drawing Figures

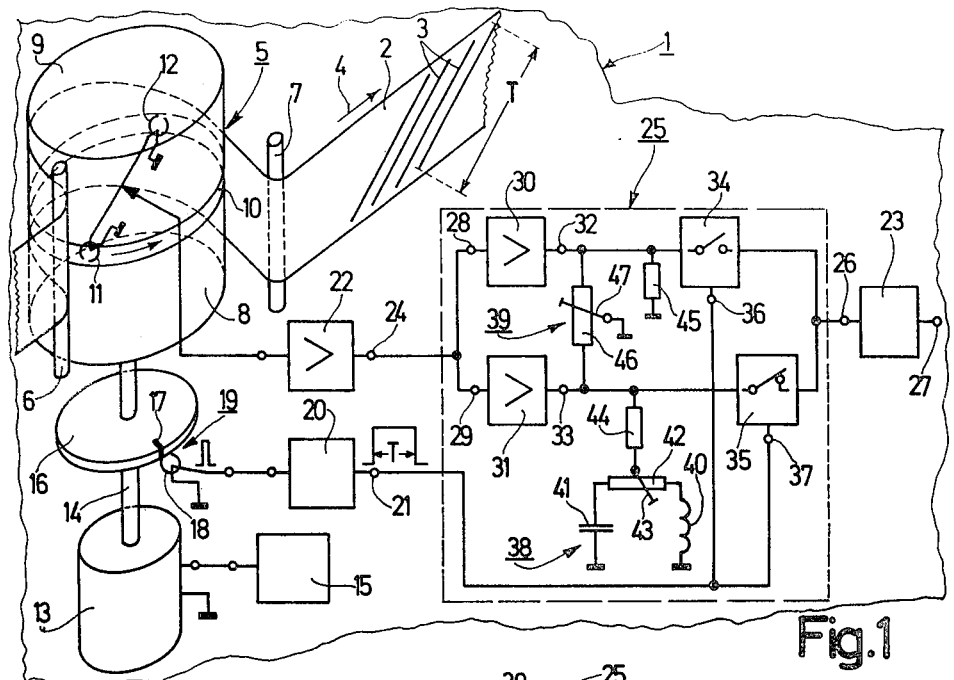
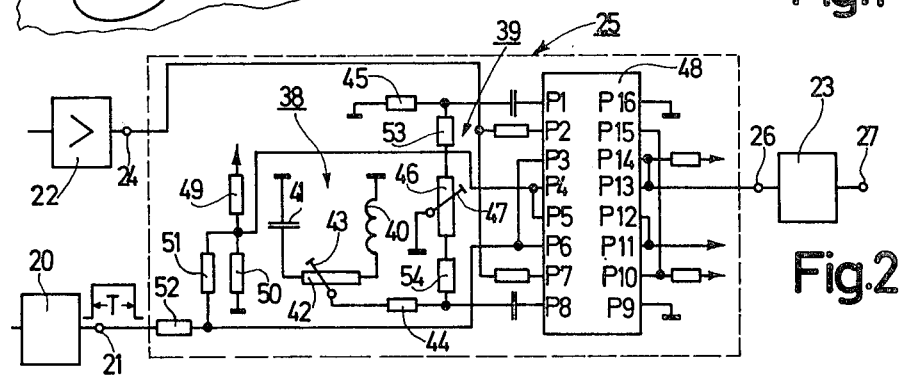
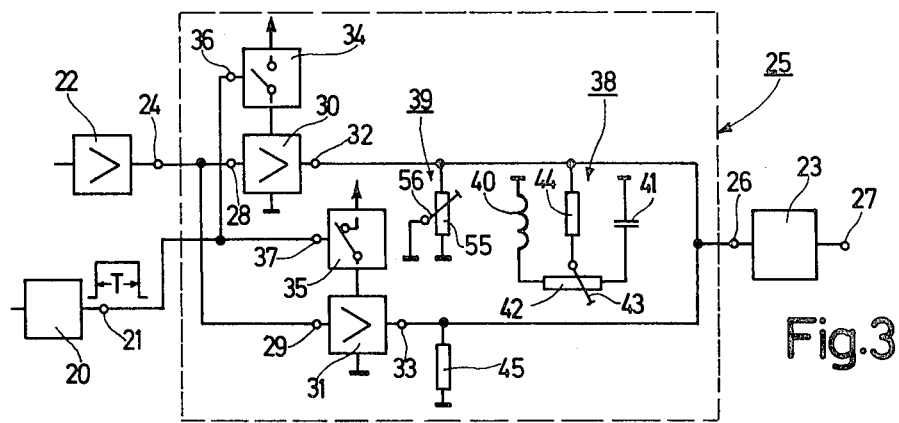

REPRODUCING APPARATUS

The invention relates to a reproducing apparatus for information signals recorded on a record carrier in the form of a tape, which apparatus comprises rotatable reproducing heads each consecutively co-operating with the record carrier for a given scanning period in order to reproduce the recorded information signals. The rotary position of each head relative to the record carrier can be detected by means of a position encoder which supplies position pulses. The encoder is connected to a pre-amplifier which is common to the reproducing heads and whose output is connected to the inputs of signal-correction compensation stages associated with the reproducing heads. The outputs of the compensation stages are connected to an input of a signal-processing circuit which follows the compensation stages. The compensation stage associated with the reproducing head which instantaneously co-operates with the record carrier supplies its output signal to the signal-processing circuit during the scanning period of the relevant reproducing head, depending on the position pulses. Such apparatus is, for example, described in DE-AS No. 14 62 409 which corresponds to U.S. Pat. No. 3,381,083.

The known apparatus comprises compensation stages which serve for correcting the frequency response of the reproducing heads. Said compensation stages each comprise a differential amplifier whose two inputs are each connected to one of a the two ends of delay line, the input signal on one input of the differential amplifier being subject to amplitude control by means of a control circuit. Such a compensation stage for frequency response correction has been provided for each individual reproducing head. By alternately taking the output signals from the compensation stages during each scanning period of the reproducing heads it is ensured that the information signals reproduced by a reproducing head are always processed by the same compensation stage. Thus, one specific compensation stage is assigned to each of the reproducing heads. It is apparent from the foregoing that in the known apparatus the provisions for frequency-response correction of the reproducing heads are comparatively intricate and costly. As stated, only provisions for frequency response correction of the reproducing heads have been taken, so that a correction of the amplitude characteristics of the reproducing heads is not possible, which is a disadvantage in view of further signal processing in the signal processing circuit.

It is the object of the invention to provide both a frequency-response correction and an amplitude correction for the reproducing heads of a reproducing apparatus of the type mentioned in the opening paragraph using very simple means and guaranteeing a proper correction in spite of the simplicity. To this end the invention is characterized in that in an apparatus comprising two reproducing heads only one of the two signal-correction compensation stages associated with said reproducing heads has an adjustable frequency-dependent network for frequency-response correction and at least one of said two compensation stages comprises a further adjustable frequency-independent network for amplitude correction. Since only one of the two compensation stages comprises an adjustable frequency-dependent network for frequency response correction, this is advantageous both with respect to the required circuitry and with respect to the adjustments to be performed. By suitably adjusting said one frequency-dependent network, the frequency response of one of two reproducing heads associated with the compensation stage with said network, can be adapted or matched to the frequency response of the other of the two reproducing heads with which the other compensation stage is associated. Thus by means of one adjusting operation equal frequency-response conditions and a corresponding frequency-response correction are obtained for the information signals supplied by the two reproducing heads. As is known, the frequency response of such reproducing heads is such that the reproduction of high-frequency signal components by individual reproducing heads is better or worse than the reproduction of low-frequency signal components. For this reason the frequency-dependent network for frequency-response correction is selected so that by means of this network a frequency-response correction of the signal components of higher frequencies can be achieved, enabling the last-mentioned signal components to be boosted or attenuated relative to the low-frequency signal components. By adding at least one further adjustable frequency-independent network for amplitude correction, the amplitudes of the information signals supplied by the two reproducing heads can also be adapted or matched to each other in a simple manner. Hence, it is also possible to obtain equal amplitude characteristics for these signals even though the reproducing heads in fact supply different signal amplitudes when the recorded information signals are equal. Since the steps in accordance with the invention ensure that the conditions as regards frequency response and amplitude characteristics are the same for the information signals alternately supplied by the two reproducing heads, the signals may be treated similarly in the signal processing circuit following the compensation stages. Therefore, the circuit elements in said processing circuit, such as amplifiers, demodulators, filters and other circuitry influencing the frequency response can be optimized for the signals to be processed, ensuring a correct processing of the reproduced information signals. The simplicity of the steps in accordance with the invention leads to a cheap and reliable solution, which is particularly suitable for equipment for reproducing television signals.

The circuit design of the frequency-dependent network may differ depending on the desired frequency-response correction. In this respect it is found to be particularly advantageous if the frequency-dependent network for frequency response correction comprises a coil, a capacitor and a potentiometer. One terminal of the potentiometer is connected to a terminal of the coil whose other terminal is connected to reference potential. The other terminal of the potentiometer is connected to a terminal of the capacitor whose other terminal is connected to reference potential and the wiper of the potentiometer is connected to the signal path of the compensation stage. This results in a very simple circuit design and a simple adjustment procedure, adaptation of the frequency response being possible both capacitively and inductively.

In an apparatus in which the information signals recorded on the record carrier are frequency-modulated with a given frequency swing, it is found to be advantageous if the frequency-dependent network for frequency-response correction has a resonant frequency near the low-frequency end of the given frequency swing.

This ensures that higher-frequency components, which are reproduced less satisfactorily by the reproducing heads and which contain frequencies in the upper frequency range of the frequency swing, can be boosted or attenuated simply by accordingly adjusting the network. Especially signal components whose frequencies are situated below the given frequency swing, that is side-band components which readily give rise to interference, can then be attenuated.

Furthermore, it is found to be advantageous if both compensation stages comprise a frequency-independent further network for amplitude correction, the two networks being combined in the same way as a balance control and comprising a further potentiometer having its one terminal connected to the signal path of one compensation stage and having its other terminal connected to the signal path of the other compensation stage, its wiper being connected to reference potential. This is also beneficial for a simple circuit design and a simple adjustment procedure.

Three embodiments of the invention will now be described in more detail, by way of example, with reference to the drawing. FIG. 1 schematically represents the relevant part of a reproducing apparatus for information signals recorded in inclined tracks on a record carrier in a first embodiment of the invention, FIG. 2 partly shows an apparatus in a second embodiment of the invention, which is a modification of the apparatus shown in FIG. 1, in which the amplifier stages in the compensation stages and switching stages which are connected to the outputs of said amplifier stages are constructed as an integrated circuit, and FIG. 3 shows a part of an apparatus in a third embodiment of the invention, which is a modification of the apparatus shown in FIG. 1.

FIG. 1 shows a part of a reproducing apparatus 1 for information signals, such as for example television signals, recorded on a magnetizable record carrier 2 in the form of a tape. The information signals have been recorded on the record carrier in information tracks 3 which are inclined relative to the longitudinal direction of the record carrier 2. The record carrier 2, which, in known manner, can be driven with constant speed in the direction of the arrow 4 by means of a capstan and a pressure roller, is wrapped around a two-part drum-shaped tape guide 5, the wrapping path being defined by two pin-shaped tape guides 6 and 7, shown schematically. The drum-shaped tape guide 5 comprises a stationary drum half 8 and a rotatable drum half 9. Between the two drum halves is a gap 10 through which two reproducing heads 11 and 12 arranged on the rotatable drum half 9 can alternately co-operate with the record carrier 2 which has been wrapped around the tape guide 5. The drum half 9 is driven by a motor 13, whose motor shaft 14 is connected to the drum half 9. The motor 13 is connected to a servo-control circuit 15, which ensures that the motor is driven with a predetermined constant speed in the anti-clockwise direction. The speed of the motor 13, and thus of the reproducing heads 11 and 12 and the speed of transport of the record carrier 2, is selected so that during a specific scanning period T the rotating reproducing heads consecutively co-operate with the record carrier and alternately scan the information tracks 3 in order to reproduce the information signals recorded in said tracks. The length of the information tracks 3 corresponds to the scanning period T, as indicated in FIG. 1.

Mounted on the motor shaft 14 is a disk 16, which carries a small magnet 17. Arranged near the path along which the magnet 17 moves is a stationary magnetic head 18, into which the magnet 17 induces position pulses during rotation of the disk 16. Since the position of the magnet 17 on the disk 16 relative to the position of the reproducing heads 11 and 12 is fixed, the magnet 17 and the magnetic head 18 constitute a position encoder 19. The encoder supplies position pulses from which the rotary position of the two magnetic heads 11 and 12 relative to the record carrier can be derived. Since the reproducing heads 11 and 12 rotate in a specific relation to the record carrier 2, the position pulses supplied by the position encoder 19 make it possible to determine at which instant each of the two magnetic heads begins to scan an information track. In the present case the position pulses from the position encoder are applied to a pulse generator 20, which, depending on the position pulses, produces control pulses having a duty factor of 1:1 on its output 21. The leading edges of the control pulses coincide exactly with the instant at which the reproducing head 11 begins to scan an information track and the trailing edges coincide exactly with the instant at which the reproducing head 11 stops scanning an information track. The duration of the control pulses consequently corresponds exactly to the scanning period T during which the reproducing head 11 co-operates with the record carrier 2 and thus reproduces the information signals stored in the information tracks scanned by it. As a result of the 1:1 duty factor, the length of the pulse spacings between the control pulses also corresponds to the scanning period T, namely to the scanning period of the other reproducing head 12 with which the record carrier 2 co-operates and which thus reproduces the information signals stored in the information tracks scanned by this head.

Via a rotary transformer, which is not shown for the sake of simplicity, the reproducing heads 11 and 12 are connected to a common pre-amplifier 22. The output of the pre-amplifier is connected to the inputs of the signal-correction compensation stages associated with the two reproducing heads 11 and 12, whose outputs are connected to an input of a signal-processing circuit 23 which follows the compensation stages. In the present case the output 24 of the pre-amplifier 22 is connected to a correction circuit 25, which comprises the said compensation stages and which is connected to the input 26 of the signal processing circuit 23. The information signals are then available on the output 27 of the signal processing circuit 23 which may comprise the amplifiers, signal separator stages, demodulators, filters and further circuitry for influencing the frequency response etc. The compensation stages in the correction circuit 25 comprise two amplifier stages 30 and 31, whose inputs 28 and 29 are connected to the output 24 of the common pre-amplifier 22. The output signal, available on the respective output 32 or 33 of the compensation stage 30 or 31 respectively associated with the reproducing head 11 or 12 which instantaneously co-operates with the record carrier 2, are applied to the input 26 of the signal-processing circuit 23 during the scanning period T of the relevant reproducing head 11 or 12, depending on the position pulses.

For alternately transferring the output signals of the two compensation stages 30 and 31 during each scanning period T, a first controllable switching stage 34 is connected to the output 32 of the one compensation stage 30 and a second controllable switching stage 35 is connected to the output 33 of the other compensation stage. The outputs of the two controllable switching circuits 34 and 35 are connected to the input 26 of the signal-processing circuit 23. The first switching stage 34 is turned on by the application of a control signal to the control input 36 so that its output is electrically connected to its input. The second switching stage 35 is turned off by the application of a control signal to the control input 37 so that its output is electrically isolated from its input. The two control inputs 36 and 37 of the switching stages 34 and 35 are connected to the output 21 of the pulse generator 20. The control pulses, which are supplied by generator 20 and which are derived from the position pulses supplied by the position encoder 19, are used as control signals for the switching stages 34 and 35. As already stated, the control pulses coincide with each scan of the reproducing head 11 and turn on the first switching stage 34 and turn off the second switching stage 35. This ensures that the information signal read by the reproducing head 11, after being amplified in the common pre-amplifier 22, is applied to the signal-processing circuit 23 via the one compensation stage 30 and the turned-on first switching stage 34. In other words, the compensation stage 30 is associated with the reproducing head 11. During each scan of the reproducing head 12 the pulse generator does not supply a control pulse, so that during these pulse spacings the first switching stage 34 remains turned off but the second switching stage 35 is turned on. In this way the information signal scanned by the reproducing head 12, after being amplified in the common pre-amplifier 22, is applied to the signal-processing circuit via the other compensation stage 31 and the second switching stage 35 which is now turned on. This means that the compensation stage 31 is associated with the reproducing head 12.

Each of the two reproducing heads has a specific frequency response and a specific amplitude characteristic. This means that the reproducing heads reproduce information-signal components of equal frequency in a different manner and that the reproducing heads reproduce information-signal components of equal amplitude with different amplitudes. These deviations, which may be comparatively large, adversely affect further signal processing in the common signal-processing circuit. In order to correct said deviations in a simple manner, one of the compensation stages 30 and 31 associated with the two reproducing heads 11 and 12, in the present case the compensation stage 31 associated with the reproducing head 12, comprises an adjustable frequency-dependent network 38 for frequency-response correction and at least one of the two compensation stages 30 and 31 comprises a further adjustable frequency-independent network 39 for amplitude correction.

The frequency-dependent network 38 for frequency-response correction comprises a coil 40, a capacitor 41 and a potentiometer 42. One terminal of the potentiometer 42 is connected to a terminal of the coil, whose other terminal is connected to reference potential. The other terminal of the potentiometer is connected to a terminal of the capacitor 41, whose other terminal is connected to reference potential. The wiper 43 of the potentiometer is connected to the signal path of the compensation stage 31. Via the wiper 43 of the potentiometer 41, which serves for damping the network 38, and a resistor 44 arranged in series with the wiper 43, the frequency-dependent network 38 is connected to the output 33 of the amplifier stage constituting the compensation stage 31 and thus forms a variable output resistor. When the wiper 43 of the potentiometer 42 is in its center position, the frequency-dependent network 38 in principle constitutes a frequency-independent d.c. resistance, connected to the output 33 of the compensation stage 31. In order to provide the same conditions at the output 32 of the compensation stage 30, an equal d.c. resistance is provided in the form of a fixed output resistor 45 connected to the output 32. When the wiper 43 of the potentiometer 42 is moved out of its centre position, the the frequency-dependent network 38 of the compensation stage 31 becomes either more capacitive or more inductive. In the firstmentioned case, the frequency response will fall, i.e. signal components of higher frequencies are attenuated relative to signal components of lower frequencies, and in the second case, the frequency response will rise, i.e. signal components of higher frequencies are boosted relative to signal components of lower frequencies. By an appropriate adjustment of the wiper 43 of the potentiometer 42 the frequency response for the information signals supplied by the reproducing head 12 and applied to the associated compensation stage 31 can simply be adapted to the frequency response by the information signals supplied by the reproducing head 11 and applied to the associated compensation stage 30 through a corresponding boost or attenuation of the relevant signal components. Thus, by simply adjusting one potentiometer the same frequency response is obtained for all the information signals applied to the signal-processing circuit 23, which is of advantage for further signal processing.

As already stated, the apparatus of FIG. 1 serves for reproducing television signals. It is known that the luminance signals recorded on the record carrier have been frequency-modulated with a specific frequency swing. The frequency swing may, for example, be in the range from 3.3 MHz to 4.8 MHz. It is found to be particularly advantageous if the frequency-dependent network 38 associated with the compensation stage 31 has a resonant frequency near the low-frequency end of the given frequency swing. The resonant frequency may, for example, be selected to be in the range from 3.0 MHz to 3.5 MHz. At the resonant frequency, the network virtually behaves as a d.c. resistance, so that the frequency response is not influenced. In an apparatus for reproducing FM television signals this is not necessary, because near the low-frequency end of the frequency swing the frequency response is substantially constant because of the comparatively satisfactory reproducing characteristic of the reproducing heads, so that the desired result is obtained without any correction. In the upper frequency range of the frequency swing, the reproducing characteristic of the reproducing heads, as is known, are less satisfactory. Hence, in this range, frequency-response deviations occur and a frequency-response correction is necessary, which can readily be achieved by means of the said frequency-dependent network 38 having the specified resonant frequency. In the upper frequency range of the frequency swing the behaviour of the network 38 will be more or less inductive or capacitive depending on the setting of the potentiometer 42, so that, as already stated in the foregoing, the signal components in this frequency range are boosted or attenuated respectively. By boosting or attenuating the signal components from the reproducing 12 which pass through the compensation stage 31, said components are matched to the signal components from the reproducing head 11 which pass through the compensation stage 30, so that the overall frequency response of the signals applied to the signal processing circuit 23 is the same.

In the present case, the two compensation stages 30 and 31 also comprise a frequency-independent network for amplitude correction, the two networks being combined to form a kind of balance control constituted by a further potentiometer 46. One terminal of potentiometer 46 is connected to the signal path of one compensation stage and the other terminal is connected to the signal path of the other compensation stage, with its wiper 47 being connected to reference potential. The potentiometer 46 is also connected to the two outputs 32 and 33 of the compensation stages 30 and 31. Hence, by an appropriated setting of the potentiometer 46, the amplitudes of the output signals of the amplifier stages 30 and 31, which serve as compensation stages, can be made exactly equal to each other, although in the case of recorded information signals of equal magnitude the two reproducing heads 11 and 12 supply signals of different amplitudes to the two compensation stages 30 and 31 because of their different amplitude characteristic. Thus, the signals supplied to the common signal-processing circuit 23 by the two compensation stages 30 and 31 have equal amplitude proportions. In this way the different amplitude characteristics of the reproducing heads 11 and 12 can simply be corrected by adjusting the further potentiometer 46.

As will be apparent from the foregoing, both the frequency response and the amplitude characteristics of two reproducing heads which alternately scan a record carrier are corrected by particularly simple means and in a particularly simple manner in the reproducing apparatus in accordance with the invention. As a result of this the signals applied to the common signal-processing circuit for further processing are subject to similar conditions both as regards frequency and amplitude, so that said signals can be treated in the same way in the signal processing circuit. This enables the individual circuit sections of the signal processing circuit to be optimized, which ensures a correct and interference-free reproduction of the recorded information signals.

In the apparatus shown in FIG. 2, the amplifier stages 30 and 31, which serve as compensation stages, and the two switching stages 34 and 35 of the apparatus shown in FIG. 1 comprise similar circuitry constructed as an integrated circuit 48, which is commercially available under the type designation TCA 240. The pins of the integrated circuit 48 are designated P1 to P16. The integrated circuit 48 comprises two single-stage transistor amplifiers as amplifier stages, which receive the signal supplied by the common pre-amplifier 22 via the pins P 2 and P 7 respectively. As switching stages the integrated circuit comprises two differential amplifiers, whose inputs are driven via the pins P 3, P 4 and P 5, P 6 respectively. A bias voltage obtained by means of a voltage divider comprising two resistors 49 and 50 is applied to the pins P 3 to P 6, i.e. directly to the pins P 4 and P 5 and via a series resistor 51 to the pins P 3 and P 6. Via a further series resistor 52, the control pulses from the pulse generator 20 are applied directly to the pins P 3 and P 6 and, attenuated via the series resistor 51, to the pins P 4 and P 5. The output signals of the switching stages in the form of differential amplifiers are available on the pins P 13 and P 14 of the integrated circuit and are applied to the common signal-processing circuit 23. When a control pulse appears and the record carrier is scanned by the reproducing head 11, the switching stage controlled by the pins P 3 and P 4 is influenced in such a way that it transfers an output signal to the pin P 14. If no control pulse appears and the reproducing head 12 co-operates with the record carrier, the switching stage controlled via the pins P 5 and P 6 is influenced so that it transfers an ouput signal to the pin P 13.

In the integrated circuit 48 the outputs of the amplifier stages are formed by the collectors of the transistors forming the single-stage transistor amplifiers. The frequency-dependent network 38 for frequency response correction and its series resistor 44, which are connected to the signal path of the compensation stage, are then not connected to the output of the one amplifier stage, that is to say to the collector of the one transistor, but to the emitter of said transistor. The same applies to the corresponding resistor 45, associated with the other amplifier stage, and the frequency-independent network 39 for amplitude correction, which in the present case comprises the series arrangement of a first series resistor 53, the further potentiometer 46 and a second series resistor 54. Via two isolating capacitors, said networks are connected to the pins P 1 and P 8, which are connected to the emitters of the single-stage transistor amplifiers. In the present case the two networks 38 and 39 then form variable emitter-resistances, by means of which the gain factors of the single-stage transistor amplifiers can be varied. When the network 38 is made to behave capacitively by correspondingly adjusting the wiper 43 of the potentiometer 41, this results in a rising frequency response, i.e. the information-signal components of higher frequencies are boosted relative to the signal components of lower frequencies. If the network 38 is made to behave inductively, a falling frequency response is obtained, i.e. informationsignal components of higher frequencies are attenuated relative to signal components of lower frequencies. Consequently, the frequency response has now been inverted in comparison with that of the apparatus shown in FIG. 1. For the remainder the operation of the correction circuit 25 of the apparatus shown in FIG. 2 is the same as that of the corresponding circuit in the apparatus shown in FIG. 1.

As can be seen in FIG. 2 the use of an integrated circuit results in a particularly simple circuit design, whilst in addition a very high reliability is obtained. Including the correction network in the emitter circuit of the pre-amplifier stages has the advantage that the networks with a comparatively low impedance may be used, which generally is an advantage for the circuit design. Moreover, the effect of the networks is promoted in known manner by the negative feedback action.

FIG. 3 represents a reproducing apparatus which is a modification of the apparatus shown in FIG. 1. For alternately transferring the output signals of the two compensation stages 30 and 31 to the signal processing circuit 23 during each respective scanning period T, the supply voltage for the two compensation stages 30 and 31 of the correction circuit 25 is alternately applied to one of the two compensation stages 30 and 31 by means of the switching stages 34 and 35. For this purpose the first switching stage 34 is arranged in the power supply connection to the compensation stage 30 and the second switching stage 35 in the power supply connection to the compensation stage 31. When the pulse generator 20 aupplies a control pulse the first switching stage 34 is turned on, so that the compensation stage 30 associated with the reproducing head 11 is operative, as a result of which the signals scanned by the reproducing head 11 and supplied by the common pre-amplifier 22 are applied to the signal processing circuit 23 via said stage. If the pulse generator supplies no switching pulse, the second switching stage 35 is turned on, so that the compensation stage 31 associated with the reproducing head 12 becomes operative, as a result of which the signals scanned by the reproducing head 12 and supplied by the common pre-amplifier 22 are applied to the signal processing circuit 23 via said compensation stage.

In the present apparatus the frequency-dependent network 38 for frequency-response correction is connected to the output 32 of the amplifier stage 30, which serves as compensation stage, via the series resistor 44 and the corresponding resistor 45 is connected to the output 33 of the amplifier stage 31 which serves as compensation stage. Thus, in the present case the frequency response of the reproducing head 11 can be adapted to the frequency response of the reproducing head 12 by an appropriate adjustment of the potentiometer 42, which again produces a corresponding boost or attenuation of the relevant signal components. The frequency-independent network 39 for amplitude correction is now constituted by a potentiometer having one terminal connected to the output 32 of the amplifier stage 30, its other terminal and its wiper 56 being connected to reference potential. By suitably adjusting the potentiometer 55 the amplitude of the output signal of the amplifier stage 30 can then be adapted to the amplitude of the output signal 31.

Thus, in the apparatus shown in FIG. 3 both the frequency response and the amplitude characteristics of the two reproducing heads can be adapted to each other in a simple manner using simple means, thereby ensuring a correct equalization of the information signals applied to the signal-processing circuit.

Obviously a series of modifications to the embodiments of the invention described in the foregoing are possible without departing from the scope of the invention. For example, it is not necessary that each compensation stage comprises an amplifier stage; instead of an amplifier stage there may solely be provided an isolating resistor. There are also further alternatives with respect to the construction of the frequency-dependent network, which for example may solely comprise a capacitor or a coil as frequency-dependent circuit element. Alternatively, each compensation stage may comprise a separate frequency-independent network, which may for example comprise a simple variable resistor.

What is claimed is:

1. An apparatus for reproducing information signals recorded on a record carrier in the form of a tape, which apparatus comprises two rotabtable reproducing heads each consecutively co-operating with the record carrier during a given scanning period in order to reproduce the recorded information signals, means for detecting the rotary position of the heads relative to the record carrier, said detecting means supplying a position signal indicative of which of said heads is cooperating with said record carrier, a common pre-amplifier which is connected to the reproducing heads, a pair of signal-correction compensation stages each associated with a respective one of the reproducing heads, said stages each having an input which is connected to an output of said pre-amplifier and an output for supplying an output signal for a signal-processing circuit which follows the compensation stages, and means responsive to said position signal for applying the output signal at the output of the compensation stage associated with the reproducing head which instantaneously co-operates with the record carrier to the signal-processing circuit during the scanning period of the relevant reproducing head, wherein only one of the two signal-correction compensation stages associated with said reproducing heads comprises an adjustable frequency-dependent network for frequency-response correction and at least one of said two compensation stages comprises a further adjustable frequency-independent network for amplitude correction so as to match the frequency response and the amplitude characteristics of the two reproducing heads to each other.

2. An apparatus as claimed in claim 1, wherein the frequency-dependent network for frequency correction comprises a coil, a capacitor and a potentiometer, one terminal of the potentiometer being connected to a terminal of the coil, whose other terminal is connected to reference potential, the other terminal of the potentiometer being connected to a terminal of the capacitor whose other terminal is connected to reference potential and the wiper of the potentiometer being connected to the signal path of the compensation stage.

3. An apparatus as claimed in claim 2, in which the information signals recorded on the record carrier are frequency-modulated with a given frequency swing, and the frequency-dependent network for frequency response correction has a resonant frequency near the low-frequency end of the given frequency swing.

4. An apparatus as claimed in claims 1,2 or 3 wherein both compensation stages comprises said further frequency-independent network for amplitude correction, the two amplitude correction networks being combined in the same way as a balance control and comprising a further potentiometer having one terminal connected to the signal path of one compensation stage and having its other terminal connected to the signal path of the other compensation stage, its wiper being connected to reference potential.

* * * * *